(12) United States Patent
Chmela et al.

(10) Patent No.: US 7,207,311 B2
(45) Date of Patent: Apr. 24, 2007

(54) METHOD FOR OPERATING A DIRECT INJECTION DIESEL ENGINE

(75) Inventors: Franz Chmela, Graz (AT); Janos Csato, Graz (AT); Michael Glensvig, Graz (AT); Theodor Sams, Graz (AT); Helmut Eichlseder, Graz (AT); Günter Figer, Graz (AT); Christian Fuchs, St. Stefan (AT); Gerhard Pirker, Graz (AT); Andreas Wimmer, Graz (AT)

(73) Assignee: AVL List GmbH, Graz (AT)

( * ) Notice: Subject to any disclaimer, the term of this patent is extended or adjusted under 35 U.S.C. 154(b) by 214 days.

(21) Appl. No.: 10/684,829

(22) Filed: Oct. 15, 2003

(65) Prior Publication Data

US 2004/0221831 A1 Nov. 11, 2004

(30) Foreign Application Priority Data

Oct. 22, 2002 (AT) .............................. GM702/2002

(51) Int. Cl.
*F02B 3/00* (2006.01)
*F02S 1/00* (2006.01)

(52) U.S. Cl. .................................. 123/305; 123/588.14

(58) Field of Classification Search ................ 123/299, 123/305, 294, 501, 568.14, 301, 568.21
See application file for complete search history.

(56) References Cited

U.S. PATENT DOCUMENTS 5,235,954 A * 8/1993 Sverdlin ..................... 123/447
5,458,293 A * 10/1995 Ganser ..................... 239/533.8
5,577,667 A * 11/1996 Ganser ..................... 293/533.8
5,692,464 A * 12/1997 Kimura ..................... 123/90.15
5,743,243 A * 4/1998 Yanagihara ............. 123/568.12
6,158,413 A 12/2000 Kimura et al.
6,216,676 B1 * 4/2001 Gotoh et al. ........... 123/568.21
6,298,835 B1 * 10/2001 Horie et al. ........... 123/568.21
6,338,245 B1 1/2002 Shimoda et al.
6,546,721 B2 * 4/2003 Hirota et al. ................. 60/297
6,712,036 B1 * 3/2004 Andersson et al. ......... 123/299
6,715,474 B1 * 4/2004 Sasaki et al. ........... 123/568.21
2001/0017127 A1 * 8/2001 Flynn et al. ................. 123/435
2002/0139357 A1 * 10/2002 Kawaguchi et al. ... 123/568.21
2003/0066286 A1 * 4/2003 Murata et al. ................. 60/284
2003/0066287 A1 * 4/2003 Hirota et al. ................. 60/297
2004/0118557 A1 * 6/2004 Ancimer et al. ............ 166/227

* cited by examiner

*Primary Examiner*—John T. Kwon
(74) *Attorney, Agent, or Firm*—Dykema Gossett PLLC

(57) ABSTRACT

A method for operating a direct injection diesel engine which is operated in a first operating region corresponding to low to medium partial load in such a way that fuel combustion takes place at a local temperature below the temperature of $NO_x$ formation and with a local air ratio above the limit value for soot formation, and where fuel injection starts in a range of between 50° to 5° crank angle before top dead center of the compression phase and where exhaust gas is recirculated at an exhaust gas recirculation rate of 50% to 70%. In order to achieve high efficiency in each operating region while keeping $NO_x$ and particulate emissions low, in a second operating region corresponding to medium partial load, fuel injection is started in a range from approximately 2° crank angle before top dead center to approximately 20° crank angle after top dead center.

21 Claims, 4 Drawing Sheets

METHOD FOR OPERATING A DIRECT INJECTION DIESEL ENGINE

BACKGROUND OF THE INVENTION

The invention relates to a method for operating a direct injection diesel engine which is operated in a first operating region corresponding to low to medium load in such a way that combustion of the fuel takes place at a local temperature below the formation temperature of $NO_x$ and with a local air ratio above the ratio at which particulates are formed, where fuel injection is initiated at a crank angle of 50° to 5° before top dead center of the compression phase and where exhaust gas is recirculated at a recirculation rate of 50% to 70%. The invention furthermore relates to an internal combustion engine implementing the method.

The most important variables governing the combustion process in a combustion engine with internal combustion are the phase of the combustion or rather the phase of the start of combustion, the maximum rate of increase of cylinder pressure, and the peak cylinder pressure.

In an internal combustion engine in which combustion occurs essentially by self-ignition of a directly injected volume of fuel, the governing variables are largely determined by injection timing, charge composition, and ignition lag. These parameters in turn depend on a multitude of variables, such as engine speed, amount of fuel, intake temperature, charge pressure, effective compression ratio, amount of inert gas in the cylinder charge, and temperature of the various parts of the engine.

Increasingly strict legal requirements necessitate the development of novel conceptions in combustion design, in order to reduce the emission of particulates and $NO_x$ in diesel engines.

It is known that $NO_x$ and particulate emission in the exhaust gas may be reduced by increasing the ignition lag by advancing the start of injection, such that combustion occurs by self-ignition of a lean fuel-air mixture. A variant of this type is termed the HCLI-method (Homogeneous Charge Late Injection). In a combustion process of this type fuel injection takes place at a large enough distance from top dead center of the compression phase to give rise to a largely homogeneous fuel-air mixture. By means of exhaust gas recirculation the combustion temperature may be kept below the temperature required for $NO_x$-formation. Since the homogenization of fuel and air is time-dependent, this method is limited as regards engine speed and load, and particle emission will increase if homogenization is insufficient.

DESCRIPTION OF PRIOR ART

U.S. Pat. No. 6,338,245 B1 describes a diesel engine operating according to the HCLI-method, in which combustion temperature and ignition lag are chosen in such a way that in the region of low to medium load the combustion temperature lies below the temperature of $NO_x$-formation and the air ratio lies above the value where particulates are produced. Combustion temperature is regulated by varying the exhaust gas recirculation rate, ignition lag is regulated via the timing of fuel injection. At medium to high load the combustion temperature is lowered such that $NO_x$ and particulate formation are both avoided. It is disadvantageous that especially in the medium load region a low air ratio combines with low combustion temperature and thus efficiency is lost.

U.S. Pat. No. 6,158,413 A describes a directly injecting diesel engine, in which fuel injection does not occur before top dead center of compression and in which oxygen concentration in the combustion chamber is reduced by exhaust gas recirculation. This method is designated here as HPLI-method (Highly Premixed Late Injection). Because of the decrease in temperature level after top dead center (in comparison with conventional injection before top dead center) and the increased amount of recirculated exhaust gas (as compared to conventional operation), the ignition lag is greater than in the case of so-called diffusive combustion. The low temperature level regulated by exhaust gas recirculation causes the combustion temperature to remain below the value necessary for $NO_x$-formation. The large ignition lag caused by retarded injection permits good mixing, thus avoiding local oxygen deficiency during combustion and in turn reducing the formation of particulate matter. The back-shifting of the combustion process causes a reduction of maximum temperature, but at the same time leads to an increase of mean temperature at a certain later crank angle, which results in an increased burning of particulates. Shifting the combustion into the expansion stroke in combination with a high exhaust gas recirculation rate will result in a rate of pressure increase in the cylinder which will remain within acceptable limits, despite a larger premixed fuel volume due to the large ignition lag, and consequently a higher maximum combustion rate. A disadvantage of the method is again low efficiency at low load.

SUMMARY OF THE INVENTION

It is the object of the present invention to develop a method of operating an internal combustion engine which will have minimum nitrogen oxide and particulate emission from low loads up to full load while maintaining high efficiency over the whole range.

According to the invention this object is achieved by starting fuel injection in a second operating region corresponding to medium load in a range of approximately 2° crank angle before top dead center to approximately 20° crank angle after top dead center, and preferably in a range of 2° crank angle before to 10° crank angle after top dead center.

In the first operating region (i.e., at low load) the internal combustion engine works according to the HCLI-method, in which fuel injection is timed relatively early in the compression stroke, i.e., in a range of approximately 50° to 5° crank angle before top dead center. Fuel injection in this first operating region occurs preferably at pressures between 400 and 1,000 bar. Combustion mainly occurs between 10° crank angle before and 10° crank angle after top dead center, resulting in very high efficiency. Due to the relatively high exhaust gas recirculation rate of between 50% and 70% the local combustion temperature lies below the temperature where $NO_x$ are produced. The local air ratio remains above the limit for particulate formation. Exhaust gas recirculation may be realized by external or internal recirculation or by a combination of both using variable valve control.

In the second operating region the internal combustion engine is operated according to the HPLI-method. Here the main part of the injection phase lies after top dead center of compression. Due to the lower temperature level after top dead center—as compared with conventional injection before top dead center—and the increased amount of recirculated exhaust gas of between 20% and 40% vis-a-vis conventional operation, the ignition lag is increased. If necessary, further measures may be adopted to increase the ignition lag, such as lowering the effective compression ratio and/or the intake temperature, or shortening the duration of injection by increasing injection pressure and/or increasing the cross-section of the injection nozzle opening. The duration of injection is chosen such that the end of injection lies before the start of combustion. In this case emission of particulates may be kept at a very low level. This can be explained by the fact that the simultaneous occurrence of liquid fuel in the fuel jet and of the flame surrounding the jet in the conventional case is avoided, whereby oxidation reactions in the vicinity of the jet, which take place under conditions of air deficiency and will generate particulates, are also eliminated. For the combustion method of the second operating region injection pressures of at least 1,000 bar are required. The advantage of the method lies in very low $NO_x$ and particulate emission and in the relatively high exhaust gas temperature, which in turn is advantageous in the regeneration of devices for treatment of the particle-exhaust gas stream.

In further development of the invention it is provided that in a third operating region corresponding to higher partial loads or to full load the main part of fuel injection takes place in the range of 10° crank angle before to 10° crank angle after top dead center, where it is preferably provided that in this third operating region multiple injection be used. The exhaust gas recirculation rate in this region amounts to as much as 30%, and preferably 10% to 20%. This will ensure good performance combined with low $NO_x$ and low particulate emission.

The internal combustion engine is operated in the first, second and/or third operating region with an overall air ratio of approximately 1.0 to 2.0.

It is preferably provided that exhaust gas recirculation be carried out externally and/or internally and that swirl be variable for at least one region, and preferably for all three regions. Swirl values between 0 and 5 will lead to good exhaust gas values at low fuel consumption.

Furthermore it is of advantage if the geometric compression ratio is variable. The geometric compression ratio should be variable in the range from 15 to 19. A high compression ratio is advantageous for the coldstart phase. Reducing the compression ratio as the load increases will increase the maximum load attainable in the first as well as in the second operating region and will reduce particulate emission due to larger ignition lag.

In this context it may be provided that the effective compression ratio be varied by shifting the closing time of at least one intake valve. By delaying the closing of the intake valve or by a very early closing of the intake valve the effective compression ratio may be reduced, thereby permitting a reduction of the exhaust gas recirculation rate required for low $NO_x$ and particulate emission. It is possible to shift both the opening time and the closing time of the intake valve, or to shift only the closing time.

In a further variant of the invention it is provided that the changeover from first to second operating region, or back from second to first region, be initiated by a reduction or an increase of the exhaust gas recirculation rate. Alternatively, the changeover from first to second operating region of the engine or vice versa may be initiated by reducing the internal or external recirculation rate and by delaying the beginning of injection, or by increasing the recirculation rate and advancing the start of injection.

Preferably it is provided that the reduction of the exhaust gas recirculation rate on changing from first to second operating region of the engine be achieved by appropriately controlling the opening and/or closing time of the intake valve.

The effective mean pressure in the first operating region is preferably between 0 and 6 bar, and more preferably 5.5 bar, in the second operating region between 3.5 and 8 bar, and more preferably between 4 and 7 bar, and in the third operating region at least 5.5 bar, and more preferably at least 6 bar, approximately.

For implementation of the method a direct injection diesel engine is required, with at least one cylinder with a reciprocating piston, in which the beginning of fuel injection may be varied at least between 50° crank angle before top dead center and 20° after top dead center, and preferably up to 50° after top dead center, and in which the exhaust gas recirculation rate may be varied between 0 and 70%. Furthermore it is provided that fuel injection pressure be variable at least between a first and a second pressure level, where the first pressure level preferably covers a range of 1,000 bar or less, and the second pressure level covers a range of 1,000 bar or more. Furthermore a device for changing the swirl level may be provided.

It is also of advantage if the opening time and the closing time of the intake process are variable. To this end it is advantageous if the timing of the intake valve or also the timing of the exhaust valve may be shifted by means of a phase shifting device. It is of particular advantage if at least one intake valve can be activated during the exhaust phase. Additionally or alternatively, activation of at least one exhaust valve during the intake phase may be provided.

BRIEF DESCRIPTION OF THE DRAWINGS

The invention will now be explained in detail with reference to the attached drawings.

DETAILED DESCRIPTION OF THE PREFERRED EMBODIMENTS

Figure 1:
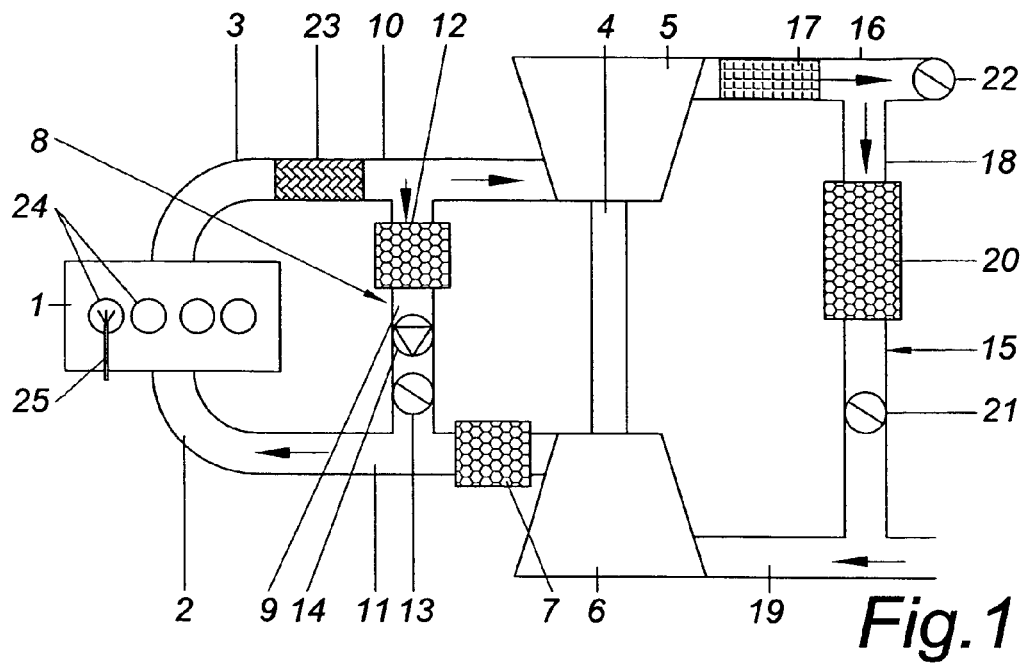
FIG. 1 shows a schematic view of an internal combustion engine suitable for the method of the invention.

FIG. 1 shows an internal combustion engine 1 with an intake manifold 2 and an exhaust manifold 3. The internal combustion engine 1 is charged by an exhaust gas turbocharger 4 comprising an exhaust-gas-driven turbine 5 and a compressor 6 driven by the turbine 5. On the intake side an intercooler 7 is placed following the compressor 6 in flow-direction.

Furthermore a high-pressure exhaust gas recirculation system (EGR-system) 8 with a first exhaust gas recirculation line 9 is provided between the exhaust gas line 10 and the intake line 11. The EGR-system 8 comprises an EGR-cooler 12 and an EGR-valve 13. Depending on the pressure difference between the exhaust line 10 and the intake line 11 an exhaust gas pump 14 may be provided in the EGR-line 9 in order increase or to control the EGR-rate.

In addition to this high-pressure EGR-system 8 a low-pressure EGR-system 15 is provided downstream of the turbine 5 and upstream of the compressor 6, a second EGR-line 18 departing from the exhaust line 16 downstream from a particle filter 17 and opening into the intake line 19 upstream of the compressor 6. In the second EGR-line 18 a further EGR-cooler 20 and a further EGR-valve 21 are provided. For controlling the EGR-rate an exhaust gas valve 22 is placed in the exhaust line 16 downstream of the point of departure of the second EGR-line 18.

Upstream of the point of departure of the first EGR-line 9 an oxidating catalytic filter 23 is placed in the exhaust gas line 10, which removes HC, CO and volatile components of particulate emissions. As a side effect this will increase exhaust gas temperature and thus the energy supplied to the turbine 5. In principle the oxidating catalytic filter 23 could also be placed downstream of the point of departure of the first EGR-line 9. The variant shown in FIG. 1, with the EGR-line departing downstream of the catalytic filter 23, has the advantage that the exhaust gas cooler 12 is less subject to contamination, while it has the disadvantage that higher exhaust gas temperatures necessitate a higher cooling performance of the exhaust gas cooler 12.

For each cylinder 24 the internal combustion engine 1 has at least one injection valve 25, directly injecting diesel fuel into the combustion chamber, which is capable of performing a multitude of injections per working cycle with the start of each injection being variable in a range of 50° crank angle CA before top dead center TDC to 50° crank angle CA after top dead center TDC. Maximum injection pressure should be at least 1,000 bar.

The shape of the combustion chamber and the configuration of the fuel injection system should be designed like those for conventional full load diesel combustion.

Figure 2:
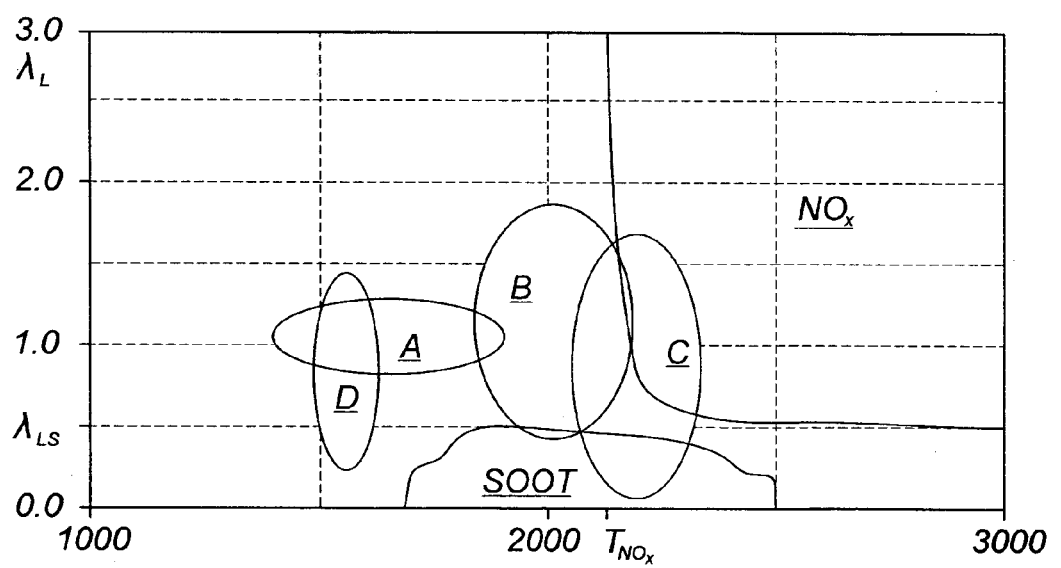
FIG. 2 is a diagram showing the local air-ratio $\lambda_L$ as a function of local temperature $T_L$.

FIG. 2 shows a diagram with the local air ratio $\lambda_L$ as ordinate and the local combustion temperature $T_L$ as abscissa. In the region designated SOOT a large amount of particulates is formed. $NO_x$ designates the region where nitrogen oxides are formed mainly. A, B and C, are the first, second and third operating regions according to the present invention.

Figure 3:
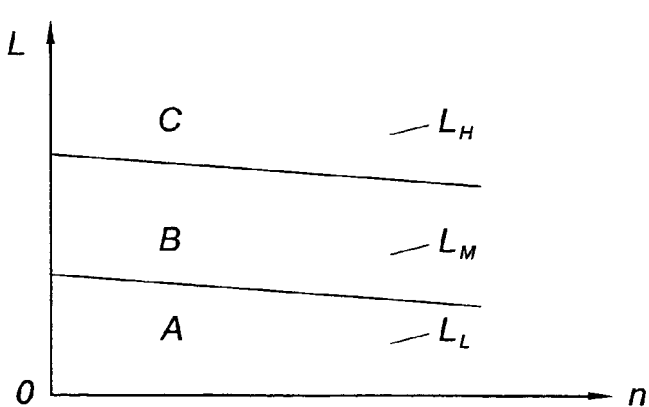
FIG. 3 is a load/speed diagram.

The first operating region A corresponds to a region of low to medium partial loads $L_L$, the second operating region B corresponds to a region of medium to high partial loads $L_M$, and the third operating region C corresponds to a region of high to full load LH, as can be seen in the load/speed diagram of FIG. 3.

In the first operating region A, also designated HCLI-region (Homogeneous Charge Late Injection), the start of injection occurs relatively early in the compression stroke, that is at 50° to 5° crank angle CA before top dead center TDC of the compression stroke, which provides a large ignition lag during which a partially homogeneous fuel-air mixture for premixed combustion can be formed. Due to thorough premixing and dilution extremely low particulate and $NO_x$ emissions can be attained. As can be seen from FIG. 2, the first operating region A lies significantly above the value $\lambda_{LS}$ of the local air ratio delimiting the region of soot formation. By using a high exhaust gas recirculation rate EGR of between 50% to 70% it is ensured that the local combustion temperature $T_L$ stays below the minimal temperature $T_{NOx}$ required for the formation of nitrogen oxides. Injection occurs at a pressure between 400 and 1,000 bar. The large ignition lag causes the combustion phase to be shifted into the area around top dead center TDC in which thermal efficiency is at an optimum. The main part of combustion takes place between −10° and 10° crank angle CA after top dead center TDC, thus resulting in high thermal efficiency. The high exhaust gas recirculation rate EGR, which is required for the first operating region A, may be achieved by external recirculation alone or by a combination of external and internal recirculation using variable valve control.

In the second operating region B the internal combustion engine is operated according to the HPLI-method (High Premixed Late Injection). The main part of the injection phase now lies after top dead center TDC. In the region B the engine is operated with an exhaust gas recirculation rate between 20% and 40%, the start of injection lying in the range of 2° crank angle CA before top dead center to 20° crank angle CA after top dead center. By completely separating the end of injection from the beginning of combustion a partial homogenization of the mixture and thus premixed combustion is achieved. Because of the lower temperature level, as compared to conventional injection before top dead center, and because of the increased volume of recirculated exhaust gas, again as compared to conventional operation, the ignition lag is increased. Further measures may also be adopted to increase ignition lag, such as decreasing the effective compression ratio E and/or the intake temperature, or shortening the duration of injection by increasing injection pressure and/or the cross-section of the injection nozzle opening. A short duration of injection is required also if the end of injection is to precede the start of combustion. In this case particulate emission may be kept at a very low level. This can be explained by the fact that the simultaneous occurrence of liquid fuel in the fuel jet and of the flame surrounding the jet in the conventional case is avoided, whereby oxidation reactions in the vicinity of the jet, taking place under lack of air and thus generating particulates, are also eliminated. The late injection time together with the relatively long ignition lag leads to a backshift of the whole combustion process and thus also causes a backshift of the cylinder pressure curve and a decrease of the maximum temperature, which leads to a low level of $NO_x$-emission.

The retarding of the combustion process causes a reduction of maximum temperature, but at the same time leads to an increase in temperature at a certain later crank angle CA, which results in an increased burning of particulates.

Shifting the combustion into the expansion stroke in combination with a high exhaust gas recirculation rate EGR will result in a rate of pressure increase in the cylinder which will remain within acceptable limits, despite a larger premixed fuel volume due to the large ignition lag and, consequently, a higher maximum combustion rate. The high maximum combustion rate, which closely approximates constant volume combustion, can at least partially compensate the loss of efficiency due to the backshifting of the combustion phase. To achieve high efficiency the main part of combustion should be as near as possible to top dead center TDC.

The advantage of the HPLI-method applied in the second operating region B lies in the very low level of $NO_x$ and particulate emission and in the high exhaust gas temperature, which is advantageous for the regeneration of a particle filter. As can be seen from FIG. 2, the local combustion temperature $T_L$ in the second operating region B lies to a small degree above the lower $NO_x$ generating temperature $T_{NOx}$. The local air ratio $\lambda_L$ lies for the most part above the limit $\lambda_{LS}$ for the formation of soot or particulate matter. In the second operating region B particulates are formed at the beginning of the combustion process, but due to strong turbulence generated by the high-pressure injection and due to high temperatures the particles are oxidated towards the end of the combustion process and overall particulate emission is therefore very low.

In the third operating region C the internal combustion engine is operated in a conventional manner with exhaust gas recirculation rates between 0 and 30%, multiple injections being possible. Thus both premixed and diffusive combustion may be used. For exhaust gas recirculation a combination of external and internal recirculation may be employed.

For reasons of comparison FIG. 2 also shows the operating region D. This region D is for instance used in U.S. Pat. No. 6,338,245 B1 in the medium to high load range. Its disadvantage is low efficiency due to the low temperatures. The present invention in general avoids this operating region.

In the first, second and/or third operating region A, B, C a swirl may optionally be generated in the combustion chamber, which can further reduce the formation of soot. Swirl and high efficiency must be balanced against each other.

It is of particular advantage if the valve timing of the internal combustion engine 1 can be variably adjusted. This will permit the rapid and precise adjustment of the EGR-rate between the operating regions A, B, and C when the load changes. By combining external and internal exhaust gas recirculation a particularly fast and precise control of the exhaust gas recirculation rate EGR is possible. Finally variable valve control also permits adjustment of the effective compression ratio $\epsilon$, which in turn permits lower nitrogen oxide and particulate emission at a reduced exhaust gas recirculation rate EGR.

Figure 4:
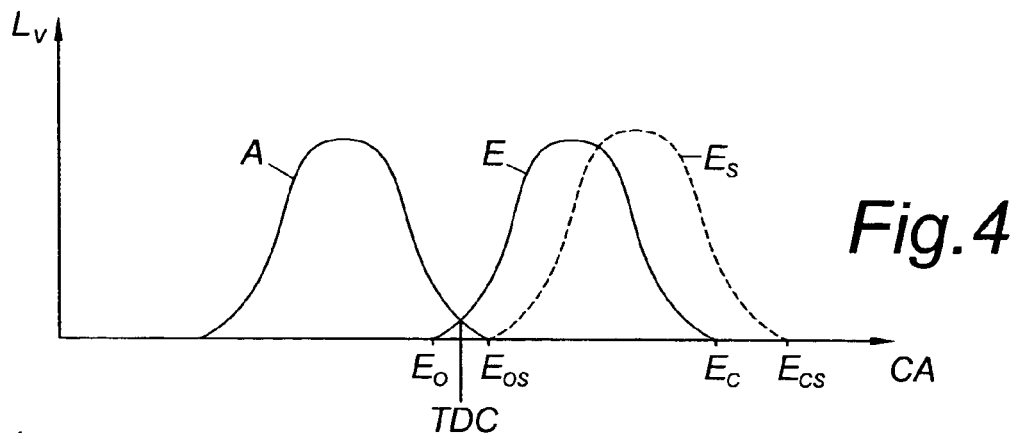
FIGS. 4 to 7 are valve lift diagrams for various timing regimes.

FIG. 4 shows a valve lift diagram, in which the valve lift $L_v$ of at least one exhaust valve A and at least one intake valve E are plotted against the crank angle CA. By backshifting the intake valve curve E, for instance by using a phase shifter, the effective compression ratio $\epsilon$ and the required exhaust gas recirculation rate EGR may be reduced. This may take place in all of the operating regions A, B, and C. $E_o$ and $E_c$, respectively, designate opening and closing time of the intake valve E. $E_{os}$ and $E_{cs}$ designate the beginning of opening and the closing time of the shifted intake valve lift curve $E_s$.

Figure 5:
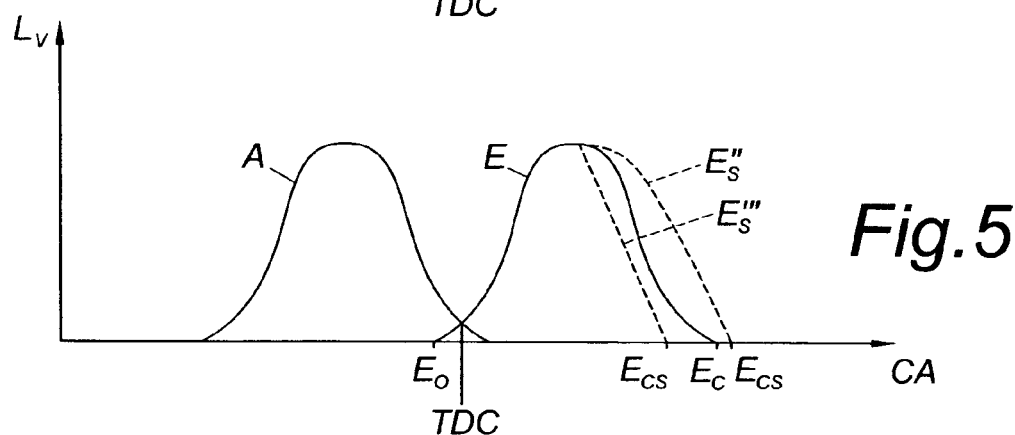

As an alternative only the closing slope of the intake valve lift curve E may be changed, which will move the closing time forward or backward, as is indicated by the lines $E_s'$ and $E_s''$ in FIG. 5. This will essentially have the same effect as shifting the whole valve lift curve (FIG. 4).

Figure 6:
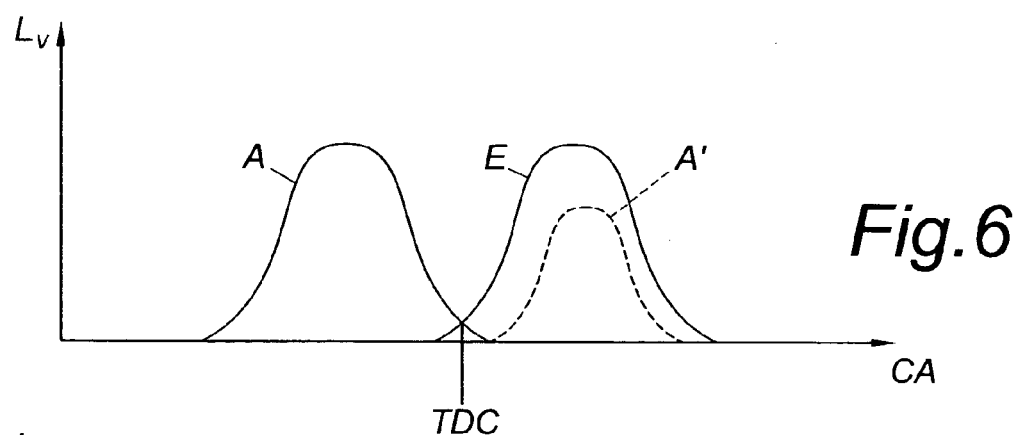
Figure 7:
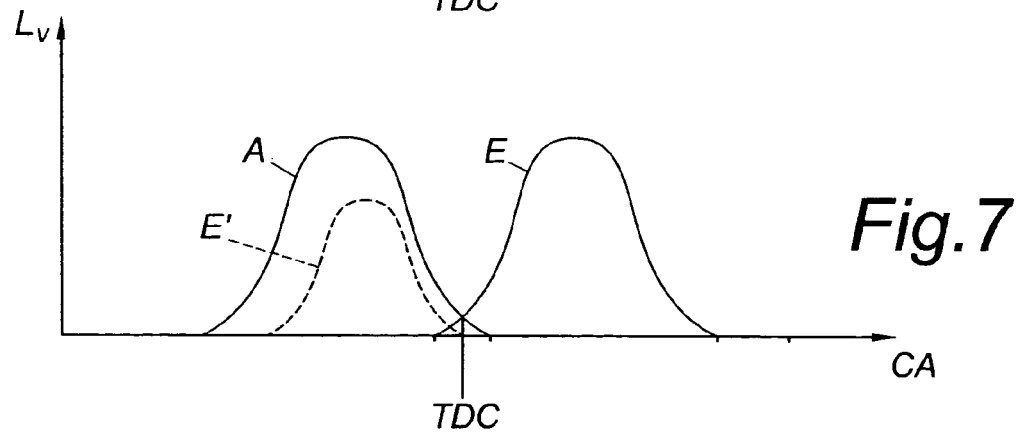

Internal exhaust gas recirculation may be effected by renewed opening of the exhaust valve during the intake stroke as shown by line A' in FIG. 6, or by renewed opening of the intake valve during the exhaust stroke as shown by line E' in FIG. 7. This will permit rapid control of the exhaust gas recirculation rate EGR in all of the operating regions A, B, and C. It is possible to achieve changeover from the second operating region B with 20% to 40% EGR-rate to the first operating region A with 50% to 70% EGR-rate by using only internal exhaust gas recirculation and a forward shift of the beginning a, of fuel injection I. The reverse changeover from the first operating region A to the second operating region B is also possible in this way.

Figure 8:
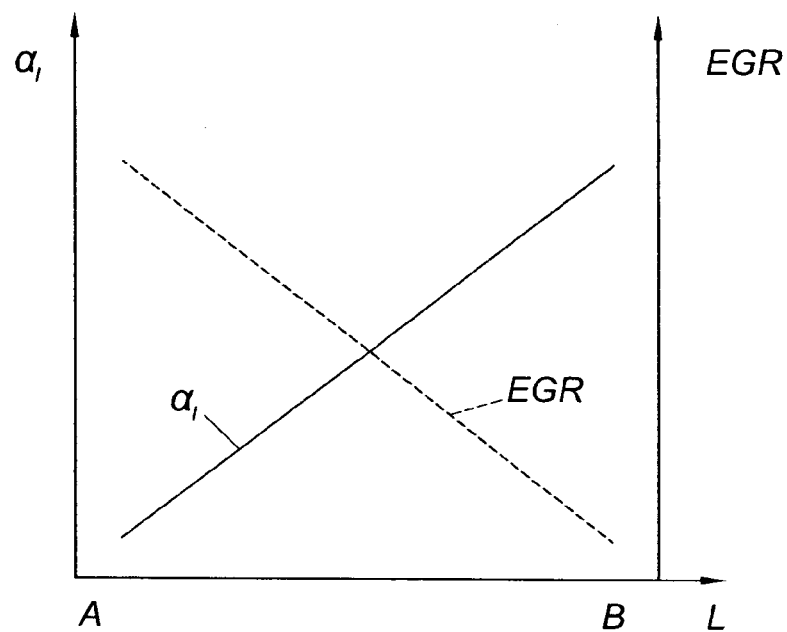
FIG. 8 is a diagram of injection time versus EGR-rate and load.

If variable valve control is not used, the changeover between first and second operating region A and B may be effected by reducing the external exhaust gas recirculation rate EGR and by simultaneously shifting the beginning $\alpha_1$ of fuel injection I forward as shown in FIG. 8. By simultaneously reducing the exhaust gas recirculation rate EGR and shifting the beginning of fuel injection I forward backfiring can be avoided. Vice versa the changeover from the second operating region B to the first operating region A may be effected by simultaneously increasing the external exhaust gas rate EGR and shifting forward the beginning a, of fuel injection I.

Figure 9:
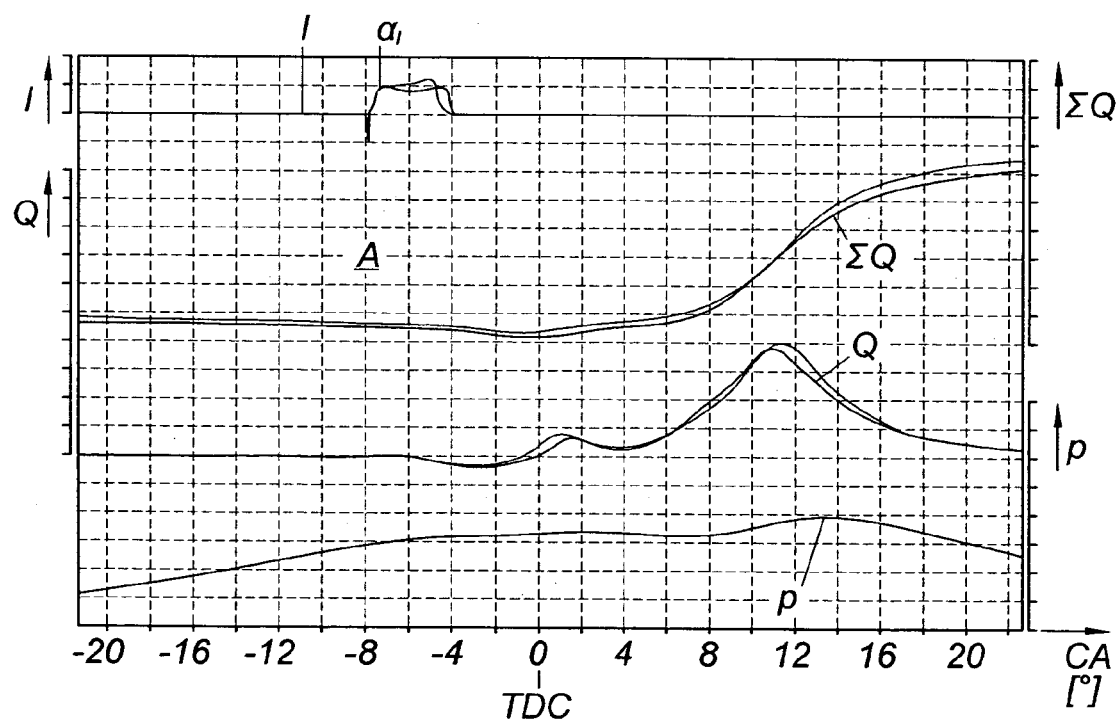
FIG. 9 is a measurement diagram for the first operating region A.
Figure 10:
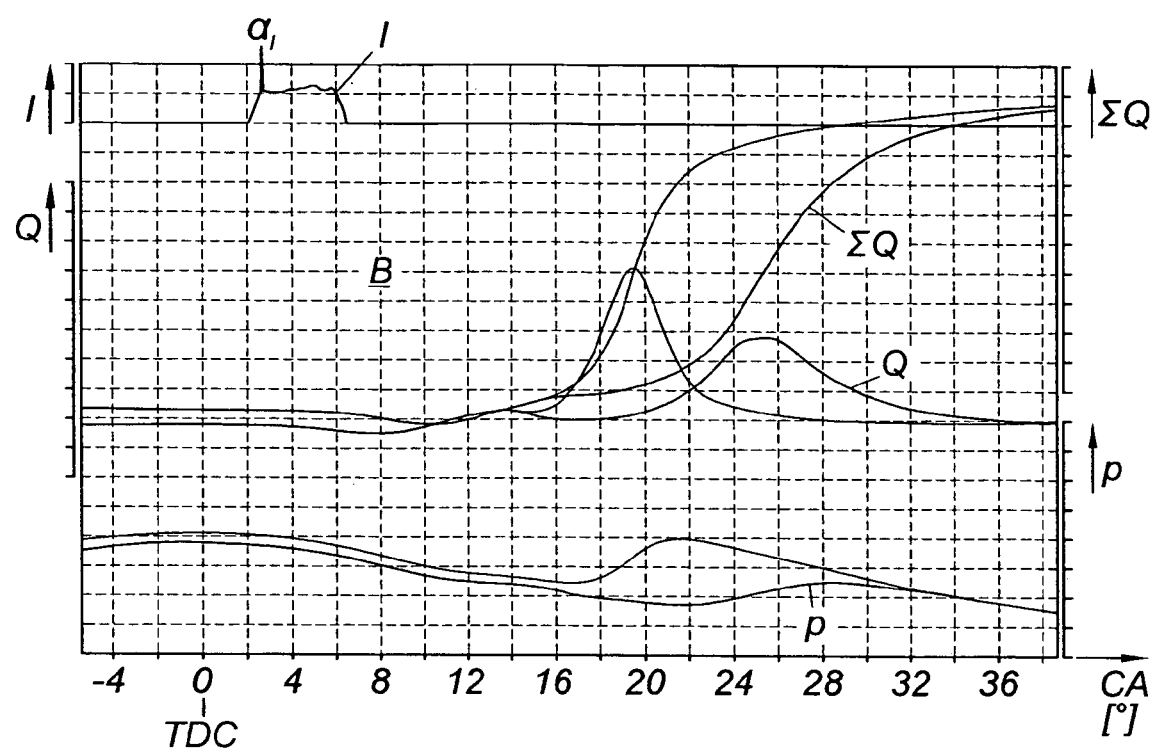
FIG. 10 is a measurement diagram for the second operating region B.

FIG. 9 shows a measurement diagram for an example of the first operating region A, where injection I, heat release rate Q, cumulative heat release rate $\Sigma Q$ and cylinder pressure p are plotted against crank angle CA. FIG. 10 shows an analogous measurement diagram for the second operating region B. Thin and heavy lines represent different parameter configurations. The relatively large ignition lag between injection I and combustion can be clearly seen.

With the method described the internal combustion engine can be operated in the first, second and third operating region A, B and C with high efficiency and low $NO_x$ and particulate emission.

What is claimed is:

1. A method for operating a direct injection diesel internal combustion engine, which is operated in a first operating region corresponding to low to medium load in such a way that combustion of the fuel takes place at a local temperature below the temperature of $NO_x$ formation and with a local air ratio above a ratio at which particulates are formed, and in which fuel injection is initiated at a crank angle of between 50° to 5° before top dead center of a compression phase and exhaust gas is recirculated at an exhaust gas recirculation rate of 50% to 70%, wherein in a second operating region corresponding to medium partial load, fuel injection is started in a range from approximately 2° crank angle before top dead center to approximately 20° crank angle after top dead center, wherein exhaust gas is recirculated in the second operating region at an exhaust gas recirculation rate between 20% and 40%, wherein fuel injection in the first operating region uses an injection pressure between 400 to 1,000 bar, wherein fuel injection in the second operating region uses an injection pressure of at least 1,000 bar, wherein in a third operating region corresponding to high partial load or full load, start of the main part of fuel injection occurs in a range from −10° to 10° crank angle after top dead center, and wherein the effective mean pressure in the third operating region is at least 5.5 bar.

2. The method according claim 1, wherein fuel injection is started in a range of approximately 2° crank angle before top dead center to approximately 10° crank angle after top dead center.

3. The method according to claim 1, wherein in the first operating region a main part of combustion lies in a range of −10° to 10° crank angle before top dead center.

4. The method according to claim 1, wherein in the third operating region multiple injection is used.

5. The method according to claim 1, wherein in the third operating region the exhaust gas recirculation rate is 30% at most.

6. The method according to claim 1, wherein in the third operating region the exhaust gas recirculation rate is 10% to 20%

7. The method according to claim 1, wherein the effective mean pressure in the third operating region is at least 6 bar.

8. The method according to claim 1, wherein a overall air ratio lies between 1.0 and 2.

9. The method according to claim 1, wherein exhaust gas recirculation is performed externally or internally.

10. The method according to claim 1, wherein a swirl value is varied in at least one operating region depending on load and engine speed.

11. The method according to claim 1, wherein a swirl value is varied in all operating regions depending on the load and engine speed.

12. The method according to claim 1, wherein an effective compression ratio is varied by shifting a closing time of at least one intake valve.

13. The method according to claim 1, wherein at least in the first and/or third operating region internal exhaust gas recirculation is performed by opening the intake valve during the exhaust phase.

14. The method according to claim 1, wherein at least in the first and/or third operating region internal exhaust gas recirculation is performed by opening the exhaust valve during the intake phase.

15. The method according to claim 1, wherein changeover from the first to the second operating region, respectively from the second to the first operating region, is initiated by reducing, respectively increasing, the exhaust gas recirculation rate.

16. The method according to claim 1, wherein changeover from the first to the second operating region or vice versa is initiated by reducing the internal or external exhaust gas recirculation rate and by delaying the start of injection, respectively by increasing the exhaust gas recirculation rate and moving the start of injection forward.

17. The method according to claim 1, wherein a decrease of the required exhaust gas recirculation rate on changing from the first to the second operational region is achieved by backshifting the opening and/or closing time of the intake valve.

18. The method according to claim 1, wherein the effective mean pressure in the first operating region is between 0 to 6 bar.

19. The method according to claim 1, wherein the effective mean pressure in the first operating region is between 0 to 5.5 bar.

20. The method according to claim 1, wherein the effective mean pressure in the second operating region is between 3.5 to 8 bar.

21. The method according to claim 1, wherein the effective mean pressure in the second operating region is between 4 to 7 bar.

* * * * *